United States Patent [19]

Mitomo et al.

[11] 4,310,499

[45] Jan. 12, 1982

[54] PROCESS FOR PRODUCING SIALON SINTERED PRODUCT

[75] Inventors: Mamoru Mitomo, Sakura; Nobuyuki Kuramoto, Tsuchiura; Yoshizo Inomata, Sakura, all of Japan

[73] Assignee: National Institute for Researches in Inorganic Materials, Ibaraki, Japan

[21] Appl. No.: 215,662

[22] Filed: Dec. 12, 1980

Related U.S. Application Data

[63] Continuation of Ser. No. 70,626, Aug. 29, 1979, abandoned.

[51] Int. Cl.³ .................... C01B 21/00; C04B 35/14
[52] U.S. Cl. .................................. 423/327; 264/65; 501/128; 501/154; 501/153
[58] Field of Search ............... 423/327; 106/65, 73.4, 106/73.5; 264/56, 65

[56] References Cited

U.S. PATENT DOCUMENTS 3,991,148 11/1979 Lumby et al. .................. 423/327 X
4,147,759 4/1979 Demit ............................ 423/327

OTHER PUBLICATIONS

Boskovic et al., "Powder Metallurgy International", vol. 9, No. 4, 1977, pp. 185-189.
Briggs, "Material Research Bulletin", 1977, vol. 12, pp. 1047-1055.

*Primary Examiner*—Edward J. Meros
*Attorney, Agent, or Firm*—Oblon, Fisher, Spivak, McClelland & Maier

[57] ABSTRACT

SIALON sintered product having the formula $$Si_{6-z}Al_zO_zN_{8-z}$$

(z is 0 to 4.2) is produced by sintering a molded product of the starting materials for SIALON in the condition of covering the surface of said molded product with a mixed powder of $Si_3N_4$ and $SiO_2$ as main components in nitrogen gas atmosphere.

4 Claims, No Drawings

PROCESS FOR PRODUCING SIALON SINTERED PRODUCT

This is a continuation of application Ser. No. 070,626, filed Aug. 29, 1976, now abandoned.

BACKGROUND OF THE INVENTION

1. Field of the Invention

The present invention relates to an improved process for producing a SIALON sintered product which has less content of X phase.

2. Description of the Prior Arts

SIALON has the formula $$Si_{6-z}Al_zO_zN_{8-z}$$

wherein z is 0 to 4.2 which has silicon nitride ($Si_3N_4$) component and a solid solution component of $Al_2O_3$-AlN spinel. SIALON is excellent as a heat resistant material as well as silicon nitride and silicon carbide.

Heretofore, the sintering of SIALON has been carried out by a hot pressing method. In accordance with the hot pressing method, a product having high density can be advantageously obtained whereas a product having complicated configuration can not be produced and a cost for the production is high to be disadvantageous.

Thus, the atmospheric pressure sintering method in which the powdery starting materials are molded and a molded product is sintered in nitrogen gas under the atmospheric pressure has been employed as the industrial process in view of an economical production and a mass production.

However, a thermal decomposition (pyrolysis) of SIALON is caused in the sintering step to prevent a contraction of the molded product and to vary the composition of the sintered product from that of the starting materials to be disadvantageous in the atmospheric pressure sintering method.

A method of preventing the change in composition materials during the sintering step has been proposed to overcome said disadvantages. For example, the following methods have been proposed.

(1) A method of covering the molded product with powdery $Si_3N_4$. (2) A method of covering the molded product with a powder of the starting materials.

However, thermal decomposition in the molded product could not be prevented by these known methods and the sintered product having high density could not be obtained.

In the conventional sintering method, the starting materials give the formula having higher oxygen content comparing with the formula of $$Si_{6-z}Al_zO_zN_{8-z}$$

have been used so as to result an easily sintering step.

However, in accordance with said method, the X phase (it is considered as $Si_9Al_7O_{21}N_9$) which has higher oxygen content, has been included in the sintered product at relatively high ratio beside SIALON phase. The presence of the X phase causes lower melting point and inferior characteristics at high temperature, to be disadvantageous.

SUMMARY OF THE INVENTION

It is an object of the present invention to overcome the disadvantages of the present invention and to provide a process for producing SIALON sintered product having uniform and high density and less content of the X phase by sintering with a small amount of weight loss during the sintering step.

The foregoing and other objects of the present invention have been attained by providing a process for producing SIALON sintered product having the formula $$Si_{6-z}Al_zO_zN_{8-z}$$

wherein z is 0 to 4.2 by molding the powdery starting materials whose components substantially correspond to said formula and covering the molded product with a mixed powder of $Si_3N_4$ and $SiO_2$ as main components and sintering it in nitrogen gas atmosphere.

DETAILED DESCRIPTION OF THE PREFERRED EMBODIMENTS

The inventors have been studied to attain the objects of the present invention. As a result, it has been found that weight loss is caused by the formation of SiO.

When the powdery starting materials for SIALON are molded and the molded product is covered with a mixture of $Si_3N_4$ and $SiO_2$ as main components and is sintered in nitrogen atmosphere, the content of the X phase is reduced to less than 2 to 3 wt.% and the sintered product has high bulk density of greater than 90% to the theoretical density and has uniform system.

The present invention has been attained by said fact.

The starting materials for SIALON comprise $Si_3N_4$-$Al_2O_3$-AlN system and $Si_3N_4$-$SiO_2$-AlN system. They are combined so as to form the components for SIALON ($Si_{6-z}Al_zO_zN_{8-z}$). The powdery starting materials are molded to obtain a molded product having a bulk density of about 1.6–2.0 g/cm³. The molded product is placed into a crucible made of alumina, silicon nitride, silicon carbide or SIALON. In the crucible, the surface of the mold product is completely covered with the mixed powder of $Si_3N_4$ and $SiO_2$ as the main components.

In the mixed powder, the content of $Si_3N_4$ is usually greater than 20 wt.% and the content of $SiO_2$ is usually in a range of 5 to 80 wt.% preferably 5 to 60 wt.%.

When the content of $SiO_2$ is less than 5 wt.%, it is difficult to prevent a weight loss of the starting materials during the sintering step whereas it is greater than 80 wt.%, the molten $SiO_2$ is reacted with the molded product to cause difficulty for the processing after the sintering step.

When the contents of $Si_3N_4$ and $SiO_2$ are in said ranges, the other components of $Al_2O_3$, Si, SiC and $Si_2N_2O$ can be incorporated in the mixed powder. The amount of the mixed powder is preferably in a range of 0.1 to 0.3 g/cm² of the surface area of the molded product.

An average grain size of silicon nitride ($Si_3N_4$) is usually in a range of 0.1 to 500 μm preferably 0.1 to 100 μm especially about 0.5 μm. An average grain size of aluminum nitride (AlN) is usually in a range of 0.1 to 500 μm preferably 0.1 to 100 μm especially about 2 μm. An average grain size of alumina ($Al_2O_3$) is usually in a range of 0.1 to 500 μm preferably 0.1 to 100 μm especially about 0.2 μm. An average grain size of silica ($SiO_2$) is usually in a range of 0.1 to 500 μm preferably 0.1 to 100 μm especially about 3 μm.

The grain sizes of these components are considered as both of the starting materials and the powder for covering the molded product. A thickness of the mixed powder covering the molded product is usually in a range of 0.1 to 200 mm preferably 0.5 to 2 mm.

The sintering of the molded product is carried out in the nitrogen atmosphere. The sintering temperature is usually ranging from 1700° to 1850° C. preferably from 1750° to 1830° C. The sintering is carried out for about 30 to 120 minutes. When the sintering temperature is lower than 1700° C., the reaction velocity is too slow to attain enough contraction whereas when it is higher than 1850° C., the thermal decomposition (pyrolysis) of the resulting SIALON or $Si_3N_4$ in the starting materials is disadvantageously caused. Sometimes, free metallic Si is formed. When the sintering step is carried out at said suitable temperature, the weight loss during the sintering step is usually in a range of 2 to 3 wt.% and a sintered product having uniform structure and high bulk density of 90 to 99% to the theoretical density can be obtained.

In accordance with the process of the present invention, the weight loss during the sintering in the atmospheric pressure is small and the sintered product having high density can be obtained. This reason is considered as follows from the results of the studies of the reactions by X rays diffraction.

$Si_2N_2O$ is formed by the following reaction in the mixed powder covering the molded product during the heating at higher than about 1600° C.

$$Si_3N_4 + SiO_2 \rightarrow 2Si_2N_2O$$

A thin layer made of $Si_2N_2O$ is simultaneously formed on the surface of the molded product by the reaction of the $Si_3N_4$ component in the molded product with the $SiO_2$ component in the mixed powder. The $Si_2N_2O$ layers in the mixed powder and on the surface of the molded product remain until substantially completing the contraction of the molded product.

The $Si_2N_2O$ component generates SiO gas by the following reaction to prevent the formation of SiO caused by the thermal decomposition of the starting materials.

$$3Si_2N_2O \rightarrow Si_3N_4 + 3SiO + N_2$$

When the content of $SiO_2$ in the mixed powder is decreased to less than 5 wt.%, the $Si_2N_2O$ component in the mixed powder or on the surface of the molded product is thermally decomposed before completing the contraction of the molded product whereby the prevention of the thermal decomposition is lost. In order to form the $Si_2N_2O$ component, it is considered that the content of $Si_3N_4$ in the mixed powder around the molded product should be greater than 20 wt.%.

The thickness of the layer of $Si_2N_2O$ formed during the sintering step on the surface of the molded product is usually less than 100 μm and is finally decomposed. After the sintering step, the separation of the molded product from the mixed powder is easily attained and the processing is remarkably easy.

In accordance with the process of the present invention, a pressure is not substantially applied during the sintering step, (which is different from the hot pressing method), whereby any directional difference in strength is not caused and a molded product having a complicated configuration made by the slip casting method and the injection molding method can be sintered. Moreover, the weight loss in the sintering step is small and the sintered product having high bulk density and high strength as those of the hot pressing method can be easily obtained. The sintered products can be advantageously utilized as heat resistant products such as gas turbine parts, heat exchangers and heat resistant mechanical parts. This is remarkably advantageous result.

The present invention will be further illustrated by certain examples and references which are provided for purposes of illustration only and are not intended to be limiting the present invention.

EXAMPLE 1

Powdery components having high purities of $Si_3N_4$ (Si: 58.6 wt.%; N: 37.9 wt.%; Al: 0.18 wt.%; Fe: 0.25 wt.%; O: 1.21 wt.%); $Al_2O_3$ (purity of greater than 99.9%); and AlN (Al: 65.0 wt.%; N: 32.3 wt.%; Si: 0.2 wt.%; O: 1.8 wt.%) were weighed and mixed so as to give the formula of $Si_4Al_2O_2N_6$ (z=2). Then 50 g. of the mixed powdery components were dispersed in hexane and ground and mixed in an alumina mill (high purity) (500 cc) for 3 hours. Since alumina was given from the alumina mill, the formula of the powdery components was adjusted by decreasing the corresponding content of $Al_2O_3$.

Then, 1.4 g. of the mixed powdery components were pressed in a mold having a diameter of 12 mm. under the pressure of 500 kg/cm² and then, further pressed it under a hydraulic pressure of 1500 kg/cm². The resulting molded product having a density of about 1.8 g/cm³ was placed in a crucible made of silicon nitride having an inner diameter of 14 mm. and a height of an inner wall of 15 mm. and the surface of the molded product was completely covered with 1.5 g. of a mixed powder of $Si_3N_4$ and $SiO_2$ at a ratio of 70:30 by weight. The crucible was held on graphite supporter in a high frequency induction heating furnace and was heated at 1800° C. for 90 minutes in 1 atm. of nitrogen gas. The temperature in the furnace was elevated at a rate of about 10° C./min. from 1600° C. to 1800° C.

The resulting sintered product had a bulk density of 3.01 g/cm³ (theoretical density: 97%) and the contraction was about 17% and the weight loss was 1.0% during the sintered step.

According to the X rays diffraction of the sintered product, the sintered product was made of the main component of SIALON and traces of the X phase and the unreacted silicon nitride (less than 3 wt.%).

EXAMPLE 2

The powdery components of Example 1 was pressed in a mold under the pressure of 250 kg/cm² to form a molded rectangular parallelepiped product having 6 mm.×8 mm.×50 mm. and further pressed under the hydraulic pressure of 1500 kg/cm² to obtain a molded product.

The molded product was placed in a crucible made of high pure alumina and the surface of the molded product was uniformly covered with 10 g. of a mixed powder of $Si_3N_4$ and $SiO_2$ at a ratio of 70:30 by weight. The crucible was heated at 1800° C. for 9 minutes in 1 atm. of nitrogen gas in accordance with the process of Example 1. The surface of the sintered product was ground to form a sample having a size of 3.95 mm.×5.55 mm.×40.7 mm. and a bulk density of 2.98 g/cm³.

The strength of the sample was measured by the bending tester (manufactured by Instron Co. U.S.A.) in the condition of a span of 30 mm. (three point bending)

and a cross-head speed of 0.5 mm/min. at room temperature to give 58 kg/mm².

EXAMPLES 3 TO 7 AND REFERENCES 1 TO 6

In accordance with the process of Example 1 sintered products were produced. The formulas for the components, the kinds of the components for the molded products and the formulas of the mixed powders, the condition for sintering steps are shown in Table 1. The results of the weight losses and the bulk densities of the sintered products are also shown in Table 1.

It is clearly understood that in accordance with the process of the present invention, the weight loss is remarkably small and the bulk density of the sintered product is remarkably high.

TABLE 1

| | Formula for starting material | Starting material | Formula for mixed powder covering (wt. %) | | Sintering condition Temp. | Time |
|---|---|---|---|---|---|---|
| Exp. 3 | $Si_4Al_2O_2N_6$ (z = 2) | $Si_3N_4, Al_2O_3$, AlN | $Si_3N_4$ $SiO_2$ | (90) (10) | 1820° C. | 60 min. |
| Exp. 4 | $Si_4Al_2O_2N_6$ (z = 2) | $Si_3N_4, Al_2O_3$, AlN | $Si_3N_4$ $SiO_2$ | (40) (60) | 1800° C. | 90 min. |
| Exp. 5 | $Si_4Al_2O_2N_6$ (z = 2) | $Si_3N_4, Al_2O_3$, AlN | $Si_3N_4$ $SiO_2$ $Al_2O_3$ | (50) (30) (20) | 1780° C. | 90 min. |
| Exp. 6 | $Si_3Al_3O_3N_5$ (z = 3) | $Si_3N_4, SiO_2$, AlN | $Si_3N_4$ $SiO_2$ SiC | (40) 40 (20) | 1800° C. | 90 min. |
| Exp. 7 | $Si_2Al_4O_4N_4$ (z = 4) | $Si_3N_4, Al_2O_3$, AlN | $Si_3N_4$ $SiO_2$ | (70) (30) | 1300° C. | 90 min. |
| Ref. 1 | $Si_4Al_2O_2N_6$ (z = 2) | $Si_3N_4, Al_2O_3$, AlN | $Si_3N_4$ | | 1800° C. | 60 min. |
| Ref. 2 | $Si_4Al_2O_2N_6$ (z = 2) | $Si_3N_4, Al_2O_3$, AlN | $Si_4Al_2O_2N_6$ (powder) | | 1800° C. | 60 min. |
| Ref. 3 | $Si_4Al_2O_2N_6$ (z = 2) | $Si_3N_4, Al_2O_3$, AlN | $Si_3N_4$ $Al_2O_3$ | (60) (40) | 1800°C. | 60 min. |
| Ref. 4 | $Si_4Al_2O_2N_6$ (z = 2) | $Si_3N_4, SiO_2$, AlN | SiC $SiO_2$ | (70) (30) | 1800° C. | 60 min. |
| Ref. 5 | $Si_3Al_3O_3N_5$ (z = 3) | $Si_3N_4, SiO_2$, AlN | AlN $SiO_2$ | (40) (60) | 1800°C. | 60 min. |
| Ref. 6 | $Si_2Al_4O_4N_4$ (z = 4) | $Si_3N_4, Al_2O_3$, AlN | Si $SiO_2$ | (30) (70) | 1800°C. | 60 min. |

TABLE 1

| | Weight loss (%) | Bulk density of sintered product |
|---|---|---|
| Exp. 3 | 3.1 | 2.80 g/cm³ |
| Exp. 4 | 1.2 | 2.98 g/cm³ |
| Exp. 5 | 0.8 | 2.83 g/cm³ |
| Exp. 6 | 2.2 | 3.02 g/cm³ |
| Exp. 7 | 1.5 | 3.00 g/cm³ |
| Ref. 1 | 14.2 | 1.72 g/cm³ |
| Ref. 2 | 7.9 | 1.68 g/cm³ |
| Ref. 3 | 15.5 | 1.70 g/cm³ |
| Ref. 4 | 11.7 | 1.90 g/cm³ |
| Ref. 5 | 6.2 | 2.29 g/cm³ |
| Ref. 6 | 6.4 | 2.25 g/cm³ |

We claim:

1. A process for producing SIALON sintered product having the formula $$Si_{6-z}Al_zO_zN_{8-z}$$

(z is 0 to 4.2) which comprises sintering a molded product of the starting materials for SIALON selected from the group consisting of (i) a mixture of powdery components of $Si_3N_4$, $Al_2O_3$ and AlN; and (ii) a mixture of powdery components of $Si_3N_4$, $SiO_2$ and AlN;

in the condition of covering the surface of said molded product with a mixed powder consisting essentially of $Si_3N_4$ and $SiO_2$ in nitrogen gas atmosphere.

2. The process according to claim 1, wherein the mixed powder consists essentially of 5 to 80 wt.% of $SiO_2$ and 20 to 95 wt.% of $Si_3N_4$.

3. A process for producing SIALON sintered product having the formula $$Si_{6-z}Al_zO_zN_{8-z}$$

(z is 0 to 4.2) which comprises sintering a molded product of the starting materials for SIALON selected from the group consisting of (i) a mixture of powdery components of $Si_3N_4$, $Al_2O_3$ and AlN; and (ii) a mixture of powdery components of $Si_3N_4$, $SiO_2$ and AlN;

in the condition of covering the surface of said molded product with a mixed powder consisting essentially of $Si_3N_4$ and $SiO_2$, as main components, and $Al_2O_3$, Si, SiC or $Si_2N_2O$ as minor component.

4. The process according to claim 1, 2 or 3, wherein the sintering temperature is in a range of 1700° C. to 1850° C.

* * * * *

UNITED STATES PATENT AND TRADEMARK OFFICE
CERTIFICATE OF CORRECTION

PATENT NO. : 4,310,499

DATED : Jan. 12, 1982

INVENTOR(S) : Mamoru Mitomo, et. al.

It is certified that error appears in the above—identified patent and that said Letters Patent is hereby corrected as shown below:

ON THE TITLE PAGE,
Please correct the Priority Data to read as follows:

[30]---Foreign Application Priority Data

September 27, 1978 [JP] Japan ............ 119001

Signed and Sealed this

First Day of March 1983

|SEAL|

Attest:

GERALD J. MOSSINGHOFF

Attesting Officer     Commissioner of Patents and Trademarks